US008300853B2

(12) United States Patent
Aiso

(10) Patent No.: US 8,300,853 B2
(45) Date of Patent: Oct. 30, 2012

(54) AUDIO MIXING CONSOLE CAPABLE OF ADJUSTING BRIGHTNESS OF LED OPERATOR, AND METHOD OF OPERATING THE SAME

(75) Inventor: Masaru Aiso, Hamamatsu (JP)

(73) Assignee: Yamaha Corporation (JP)

( * ) Notice: Subject to any disclaimer, the term of this patent is extended or adjusted under 35 U.S.C. 154(b) by 417 days.

(21) Appl. No.: 12/732,237

(22) Filed: Mar. 26, 2010

(65) Prior Publication Data

US 2010/0244738 A1 Sep. 30, 2010

(30) Foreign Application Priority Data

Mar. 26, 2009 (JP) ................................ 2009-076685
Mar. 26, 2009 (JP) ................................ 2009-076686

(51) Int. Cl.
*H04B 1/00* (2006.01)
(52) U.S. Cl. ......................... 381/119; 315/279; 315/314
(58) Field of Classification Search .................. 315/297, 315/313–314; 381/119
See application file for complete search history.

(56) References Cited

U.S. PATENT DOCUMENTS 4,772,825 A * 9/1988 Tabor et al. ................... 315/312
6,438,241 B1 * 8/2002 Silfvast et al. ................ 381/119
6,728,382 B1 * 4/2004 Silfvast ......................... 381/119
2002/0186849 A1 * 12/2002 Duffy ............................. 381/58
2003/0071804 A1 4/2003 Yamazaki et al.
2005/0157830 A1 * 7/2005 Ota et al. ...................... 375/377
2005/0289613 A1 * 12/2005 Lawrence ....................... 725/80
2006/0103684 A1 5/2006 Yamazaki et al.
2008/0226099 A1 * 9/2008 Aiso et al. ..................... 381/119

FOREIGN PATENT DOCUMENTS

JP 2003-177714 A 6/2003
JP 2006-178131 A 7/2006
JP 2008-203892 A 9/2008

OTHER PUBLICATIONS

XL8 Control Centre Quick Reference Guide, online, searched on Feb. 2, 2009, the Internet URL: http://www.eviaudio.fr/doc/midas/consoles/x18_quick_reference_guide.pdf. Telex Communications, England.

Product guide "Innovative Controller operated by Xynergi Media Production Centre-FPGA CC-1 engine", online, searched on Feb. 2, 2009, the Internet URL: http://www.fairlight.co.jp/goods/goods4.html. Fairlight Japan Inc.

* cited by examiner

*Primary Examiner* — Jason M Crawford
(74) *Attorney, Agent, or Firm* — Rossi, Kimms & McDowell LLP

(57) ABSTRACT

An audio mixing console includes a brightness adjusting mode selection button and an adjustment subject specification button. A user operates the brightness adjusting mode selection button to set up a brightness adjusting mode, and operates the adjustment subject specification button to specify any color LED of RGB or all colors as an adjustment subject. When an LED button is operated, brightness of an LED of a color of an adjustment subject in a multicolor LED unit incorporated in the LED button is increased one step by one step. In another example, in response to an operation of a button, brightness of an LED of a color of the adjustment subject in the multicolor LED unit incorporated in a plurality of LED buttons other than this button is increased one step by one step. This work is carried out for every LED and LED button.

24 Claims, 6 Drawing Sheets

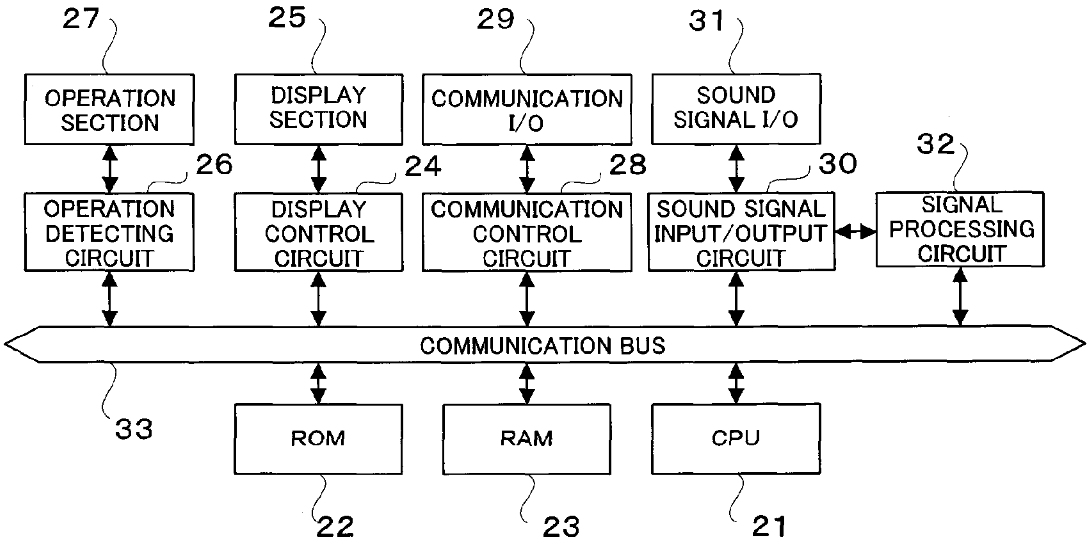
FIG. 4
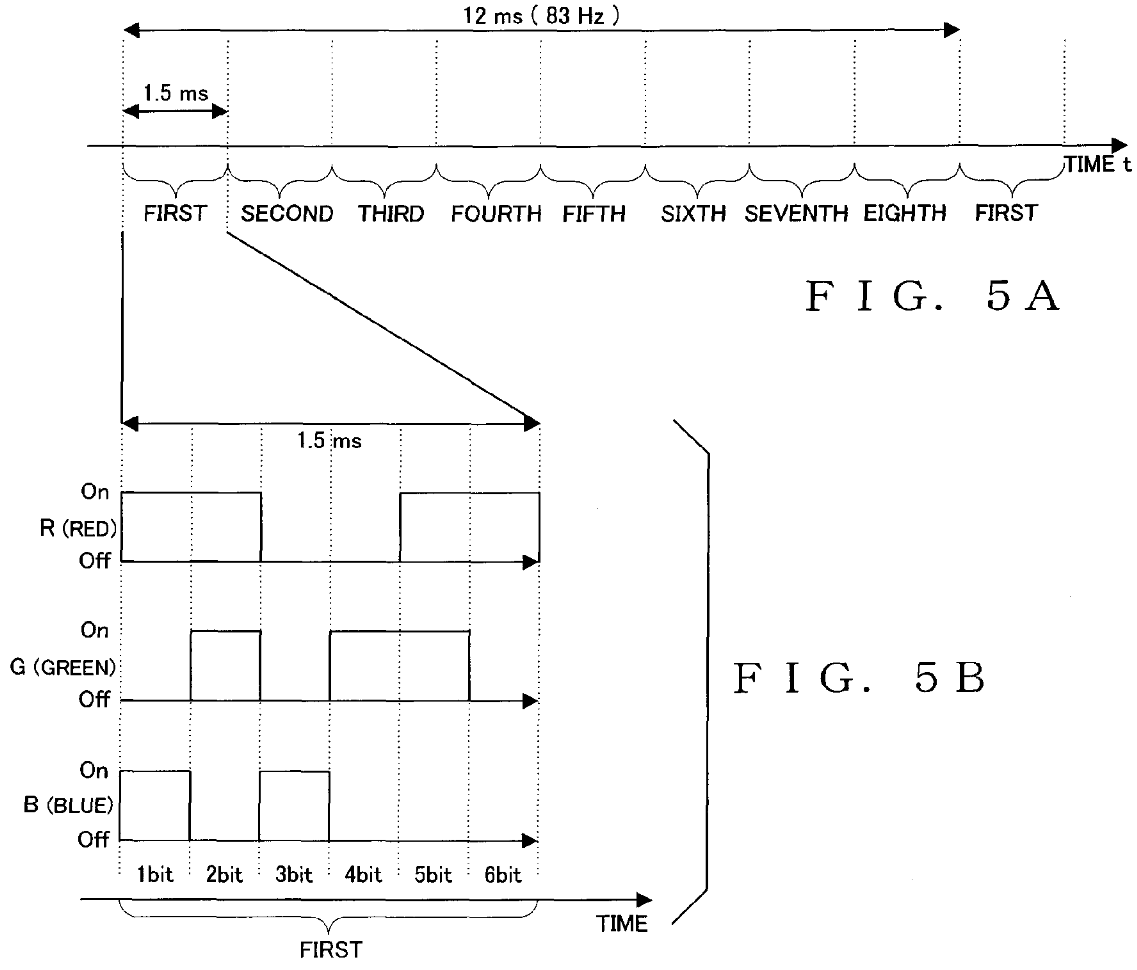
FIG. 5A
FIG. 5B

↓ HEIGHTEN RED BY PRESSING BUTTON (R: 70% 80%, G: 20% 10%, B: 50% 40%)

AUDIO MIXING CONSOLE CAPABLE OF ADJUSTING BRIGHTNESS OF LED OPERATOR, AND METHOD OF OPERATING THE SAME

CROSS-REFERENCE TO RELATED APPLICATION

The present disclosure relates to subject matter contained in Japanese Patent Applications No. 2009-076685, filed on Mar. 26, 2009, and No. 2009-076686, filed on Mar. 26, 2009, the disclosure of which is expressly incorporated herein by reference in their entirety.

BACKGROUND OF THE INVENTION

The present invention relates to an audio mixing console provided with a plurality of operators used for an operation for mixing sound signals of a plurality of channels and the like, and particularly, the present invention relates to an audio mixing console including an LED operator, in which a multicolor LED unit constituted from a set of LEDs respectively corresponding to a predetermined plurality of colors is incorporated, in the plurality of operators.

It is known to express various kinds of colors by constructing a set of multicolor LED units using three LEDs (Light Emitting Diode) respectively corresponding to RGB (red (R), green (G), blue (B)), which are three primary colors of light, and causing a red LED, a green LED and a blue LED to emit light with an arbitrary ratio of the respective colors.

The multicolor LED unit as described above is utilized for various parts of various devices. One usage example of the multicolor LED unit is that a so-called illuminated operator (LED operator) is configured by incorporating the multicolor LED unit in an operator provided in an electronic device. For example, conventionally, it has been carried out that a multicolor LED unit is incorporated in each of a large number of operators provided in the audio mixing console for audio mixing. In this case, lighting-up of the multicolor LED unit or color coding of its emitting color allows a user to intuitively compass an on/off state of a parameter assigned to the LED operator, a type of parameter and the like through sight. In general, the user of the audio mixing console must carry out complicated work using a large number of operators. For this reason, it is advantageous that the user can intuitively compass, through sight, an on/off state of a parameter, a type of parameter and the like by means of emission of the multicolor LED unit in view of workability, operability and the like.

Now, individual LEDs constituting the multicolor LED unit have a defect of large variation in light-emitting properties of individuals. For this reason, even though LEDs intend to emit light with the same light-emitting property by supplying the same drive signal to the respective LEDs of a plurality of multicolor LED units, unevenness occurs in mutual brightness of the multicolor LED units and hue of the emitting color. For example, even though a plurality of multicolor LED units are caused to emit light with the same red, it is not always that all of the multicolor LED units emit light with "red" of the same brightness or hue.

Heretofore, In order to solve a problem of variation in a light-emitting property of every LED, a device for adjusting brightness or color tones for individual LEDs has been created. As an example, there is technique to automatically measure a lighting state of each of the LEDs, to compare a result of the automatic measurement with a drive signal for turning the LED on, and to correct light-emitting properties of the respective LEDs on the basis of the comparison result (for example, see Patent Literature 1 and Patent Literature 2 below).

Further, as for a user interface of the audio mixing console, in the technique to adjust brightness and hue of display, for example, there has been one that automatically adjusts, when the user adjusts luminosity of a screen of a color LCD display provided in the audio mixing console, hue of the screen of the color LCD display and the like in accordance with the adjusted luminosity (for example, see Patent Literature 3).

Further, heretofore, there was an audio mixing console provided with a configuration to change an emitting color of an illuminated operator in which the multicolor LED unit and the like are incorporated. According to this configuration, a user could select the emitting color for every operator by launching a screen for carrying out settings regarding an operator on a display provided in the audio mixing console and selecting a desired color from a plurality of choices determined in advance on the screen (see Non-Patent Literature 1).

Further, in a controller for carrying out audio editing work and video editing work using a computer, there was technique that a display color of each operator and display characters can be changed arbitrarily in accordance with display content of the screen by emitting light to a key top portion of the operator provided on an operation panel from the inside by means of a color LCD screen embedded in the operation panel (see Non-Patent Literature 2).

[Patent Literature 1] Japanese Patent Application Laid-open Publication No. 2003-177714

[Patent Literature 2] Japanese Patent Application Laid-open Publication No. 2008-203892

[Patent Literature 3] Japanese Patent Application Laid-open Publication No. 2006-178131

[Non-Patent Literature 1] XL8 Control Center Quick Reference Guide, online, searched on Feb. 2, 2009, the Internet <URL: http://www.eviaudio.fr/doc/midas/consoles/xl8_quick_reference_guide.pdf>

[Non-Patent Literature 2] Product guide "innovative controller operated by Xynergi Media Production Centre-FPGA CC-1 engine", online, searched on Feb. 2, 2009, the Internet <URL: http://www.fairlight.co.jp/goods/goods4.html>

The respective LEDs constituting the multicolor LED unit has a defect of large variation in light-emitting properties (brightness and hue) of individuals as described above. However, in a conditional audio mixing console, there was no one that the user can adjust brightness of the multicolor LED unit incorporated in the operator.

Further, even in the case where work that the user adjusts brightness of the multicolor LED unit provisionally becomes possible in the audio mixing console, the work is appendant work in view of original functions of the audio mixing console. In addition, work for the original functions of the audio mixing console is very complicated work having a high degree of specialization. From these aspects, since the audio mixing console is configured so that the user can adjust brightness of the multicolor LED unit, it is desired that the audio mixing console can adjust the brightness of the multicolor LED unit by a method as easy as possible and that can be understood by the user.

Further, in the case where the technique described in Patent Literature 1 or 2 described above is provisionally applied to the audio mixing console, a mechanism to automatically measure a lighting state for each of a large number of LEDs corresponding to a large number of operators must be provided, whereby it costs largely. As described above, since a function that the user adjusts brightness of the multicolor LED unit is an appendant function in view of the original functions of the audio mixing console, it is desired that this function is achieved with costs as little as possible.

The audio mixing console disclosed in Non-Patent Literature 1 described above has a configuration to select the emitting color of the illuminated operator from choices of a plurality of colors in advance. For this reason, there was no one that the user can create the emitting color of arbitrary hue and adjust the hue. Further, the technique described in Non-Patent Literature 2 is designed to change a display color of each operator and display characters in response to the function set to a controlled object of the controller, but does not disclose to create the emitting color for every operator, or adjust the hue. In addition, this technique is technique to change the display color of the operator and the like by displaying a display object corresponding to the operator image on the LCD screen. For this reason, there is no one that can be applied to creation of the emitting color of the arbitrary hue in the illuminated operator of the audio mixing console, which does not have such a configuration.

In short, in the conditional audio mixing console, it was impossible to arbitrarily create hue of the emitting color of the LED operator, in which the multicolor LED unit is incorporated, in response to an operation of the user and to adjust the hue of the emitting color of the LED operator in response to an operation of the user.

Further, even though work that the user adjusts hue of the multicolor LED unit (LED operator) in the audio mixing console provisionally becomes possible, the work is appendant work in view of original functions of the audio mixing console. In addition, work for the original functions of the audio mixing console is very complicated work having a high degree of specialization. From these aspects, since the audio mixing console is configured so that the hue of the multicolor LED unit can be adjusted by means of an operation of the user, it is desired that hue adjustment of the multicolor LED unit can be carried out by a method as easy as possible and that can be understood by the user.

SUMMARY OF THE INVENTION

This invention is made in consideration of the circumstances described above, and it is an object of the present invention to provide an audio mixing console capable of adjusting brightness of an LED operator in which a multicolor LED unit is installed by means of an operation of a user.

Moreover, it is another object of the present invention to provide an audio mixing console capable of arbitrarily creating an emitting color of an LED operator in which a multicolor LED unit is incorporated by means of an operation of a user and of adjusting its hue by means of an operation of the user.

In one aspect of the present invention, the present invention is directed to an audio mixing console. The audio mixing console includes: a plurality of operators including a plurality of LED operators, a multicolor LED unit being incorporated in each LED operator, the multicolor LED unit including a plurality of LEDs corresponding to a predetermined plurality of colors as one set; a memory for storing lighting control data respectively corresponding to the plurality of LEDs constituting the multicolor LED unit, the lighting control data indicating brightness to cause the corresponding LEDs to be turned on; a lighting control section for controlling lighting of the plurality of LEDs constituting the multicolor LED unit on the basis of each of the lighting control data stored in the memory; an operation mode switching section for switching, in response to an operation of a user, an operation mode of the audio mixing console to a brightness adjusting mode for adjusting brightness of the multicolor LED unit; an adjustment subject specifying section for specifying, in response to an operation of the user, at least any one of the predetermined plurality of colors constituting the multicolor LED unit as a color of the adjustment subject; and a brightness adjusting section for changing brightness, indicated by the lighting control data stored in the memory, of the LED corresponding to the color specified by the adjustment subject specifying section in the multicolor LED unit incorporated in the LED operator corresponding to the operated operator when the user operates any one of the plurality of operators in the brightness adjusting mode.

According to the audio mixing console of the present invention, the user specifies at least any one of the predetermined plurality of colors constituting the multicolor LED unit as the color of the adjustment subject in the brightness adjusting mode and operates any one of the plurality of operators, by which it is possible to change brightness, indicated by the lighting control data stored in the memory, of the LED corresponding to the specified color in the multicolor LED unit incorporated in the LED operator corresponding to the operated operator.

This makes it possible to adjust the brightness of each of the LEDs constituting the multicolor LED unit for every LED operator in which the multicolor LED unit is incorporated in the audio mixing console in response to an operation of the user. For example, this makes it possible to adjust, on the basis of brightness of one LED operator, brightnesses of the other LED operators for every LED and easily modify variation in brightnesses of the respective LEDs among the plurality of LED operators. Moreover, this work of brightness adjustment can be carried out only by initiating (or activating) the brightness adjusting mode, specifying a color of the adjustment subject and then operating the operator corresponding to the multicolor LED unit that the user wants to carry out the brightness adjustment. For this reason, the work can be carried out by a method as easy as possible and that can be understood by the user. Further, since a mechanism to automatically measure a lighting state of the LED and the like are not required, the function of brightness adjustment can be achieved without costs.

In another aspect of the present invention, the present invention is directed to an audio mixing console. The audio mixing console includes: a plurality of operators including a plurality of LED operators, a multicolor LED unit being incorporated in each LED operator, the multicolor LED unit including a plurality of LEDs corresponding to a predetermined plurality of colors as one set; a memory for storing lighting control data respectively corresponding to the plurality of LEDs constituting the multicolor LED unit, the lighting control data indicating brightness to cause the corresponding LEDs to be turned on; a lighting control section for causing the multicolor LED unit to be turned on with hue according to a ratio of the brightnesses of the plurality of LEDs by controlling lighting of the plurality of LEDs constituting the multicolor LED unit on the basis of each of the lighting control data stored in the memory; an operation mode switching section for switching, in response to an operation of a user, an operation mode of the audio mixing console to a hue adjustment mode for adjusting hue of the multicolor LED unit; an adjustment subject specifying section for specifying, in response to an operation of the user, at least any one of the predetermined plurality of colors constituting the multicolor LED unit as a color of the adjustment subject; and a color adjusting section for changing, when the user operates any one of the plurality of operators in the hue adjustment mode, the ratio of the brightnesses of the plurality of LEDs so that the brightness of the LED corresponding to the color specified by the adjustment subject specifying section in the multicolor LED unit incorporated in the LED operator corresponding to the operated operator becomes relatively high.

According to the audio mixing console of the present invention, the user specifies at least any one of the predetermined plurality of colors constituting the multicolor LED unit as the color of the adjustment subject in the hue adjustment mode and operates any one of the plurality of operators, by which it is possible to change the ratio of the brightnesses of the plurality of LEDs so that the brightness of the LED corresponding to the color specified by the adjustment subject specifying section in multicolor LED unit incorporated in the LED operator corresponding to the operated operator becomes relatively high.

This makes it possible to arbitrarily create the hue of the emitting color for every LED operator in which the multicolor LED unit is incorporated in the audio mixing console in response to an operation of the user and to adjust the hue in response to an operation of the user. This makes it possible for the user himself or herself to set up the emitting color of each LED operator uniquely and to create an environment that is easy for the user to operate. Further, since the adjustment of hue is carried out for every LED by specifying the color of the adjustment subject, it is possible to easily modify variation in hue among the plurality of LED operators caused by variation in light-emitting properties of the respective LEDs. Moreover, this work of hue adjustment can be carried out only by initiating (or activating) the hue adjustment mode, specifying a color of the adjustment subject and then operating the operator corresponding to the multicolor LED unit that the user wants to carry out the hue adjustment. For this reason, it can be carried out by a method as easy as possible and that can be understood by the user.

BRIEF DESCRIPTION OF DRAWINGS

The foregoing and other objects, features and advantages of the present invention will become more readily apparent from the following detailed description of a preferred embodiment of the present invention that proceeds with reference to the appending drawings, in which:

FIG. 4 is a block diagram showing an electronic hardware configuration of the digital mixer of FIG. 1;

FIGS. 5A and 5B are views for explaining lighting operations of a multicolor LED unit (LED button) using a dynamic lighting method;

DETAILED DESCRIPTION OF THE INVENTION

Hereinafter, the case where an audio mixing console according to embodiments of the present invention is applied to a so-called digital audio mixer will be described with reference to the appending drawings. The digital audio mixer is a device that converts each of analog audio signals of a plurality of channels into a digital audio signal, subjects the converted digital audio signal to signal processing by means of a DSP (digital signal processor) for every channel and outputs them.

Figure 1:
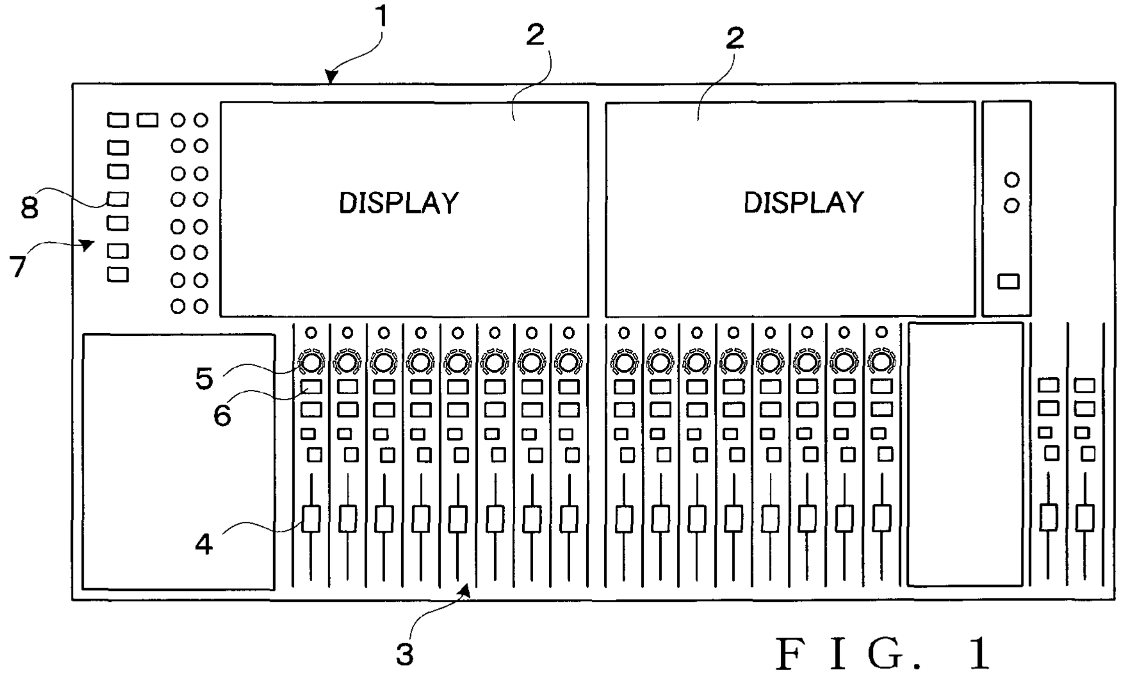
FIG. 1 is a view for explaining a summary of appearance of an operation panel in a digital mixer to which an audio mixing console according to one embodiment of the present invention is applied.

FIG. 1 is a view for explaining a summary of appearance of an audio mixing console according to one embodiment of the present invention. An audio mixing console 1 shown in FIG. 1 includes, on an operation panel, a plurality of operators used for carrying out various operations related to audio mixing and LCD displays 2 for displaying various kinds of information related to the audio mixing. The plurality of operators are arranged on the operation panel of the audio mixing console 1 so as to be classified into “sections” for every function.

In FIG. 1, a reference numeral 3 denotes a channel strip section composed of a plurality of channel strips (16 pieces in the example shown in the drawing). In each channel strip, a level operator 4 to be operated by being slided, a knob type operator (control knob) 5 operated by being rotated and a plurality of push-button switches 6 are included. A user operates any of the operators 4, 5 and 6 provided in each channel strip, by which it is possible to adjust sound characteristics (volume level and the like) of an audio signal of the channel currently assigned to the operated channel strip.

A reference numeral 7 denotes a control section including a plurality of channel selection buttons 8 for selecting a group of channels to be assigned to each channel strip of the channel strip section 3. Details of the control section 7 will be described later with reference to FIG. 3.

Each of the LCD displays 2 displays a screen on which various kinds of information are displayed. The user is allowed to monitor a state of the audio mixing on the displayed screen, and to control a parameter for each channel. In this regard, although FIG. 1 shows the configuration example of the operation panel in which the two LCD displays 2 are provided, the number of LCD displays to be provided may be either one or three or more.

In this regard, other operators and displays than those described above are provided on the operation panel of the audio mixing console 1, but illustration and explanation thereof are omitted.

An LED operator in which an LED (Light Emitting Diode) is incorporated is included in the plurality of operators provided on the operation panel of the audio mixing console 1. The “LED operator in which the multicolor LED unit is incorporated” means one in which a multicolor LED unit is provided so as to correspond to the operator. The multicolor LED unit displays an operation state of the operator, a state of a parameter related to the operator and the like by means of lighting-up.

The LED operator can have any of various forms such as a level operator (or slider) operated in a sliding manner, a knob operator (or control knob) operated in a rotary manner and a push-button switch.

In the present embodiment, an example in which the LED operator is constructed by a push-button switch will be described as an example. Hereinafter, in this specification, an LED operator in which a multicolor LED unit is incorporated is referred to as an "LED button". In FIG. 1, for example, the push-button switch 6 included in each channel strip of the channel strip section 3, or the channel selection button 8 of the control section 7 is configured by an LED button. In this case, an emitting function of the LED button can be used for various purposes such as a purpose to cause a user to visibly recognize an on/off state of the parameter assigned to the LED button by means of lighting-up, for example, and a purpose to cause the user to visibly recognize a type of parameter assigned to the LED button by means of an emitting color.

Figure 2:
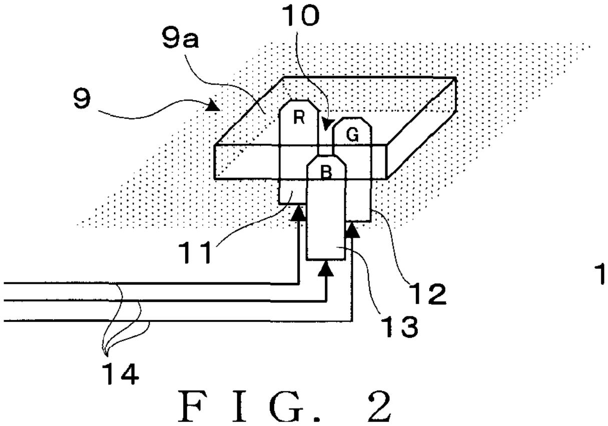
FIG. 2 is a schematic perspective view for explaining a configuration of an LED button 9 with which the audio mixing console in the digital mixer of FIG. 1 is provided.

FIG. 2 is a schematic perspective view for explaining a configuration of the LED button. In FIG. 2, a portion shown by hatching is a surface of the operation panel, a reference numeral 9 denotes the LED button, and a reference numeral 9*a* denotes a key top portion of the LED button 9. A multicolor LED unit 10 into which a plurality of LEDs lighting up with different colors from each other are unitized as one unit is incorporated in one LED button 9. More specifically, the multicolor LED unit 10 is constructed from three LEDs 11, 12 and 13 for red (R), green (G) and blue (B), which are three primary colors of the light.

The multicolor LED unit 10 can emit light with various kinds of colors, including intermediate colors, in accordance with a mixing ratio of emitting colors of the red LED 11, the green LED 12 and the blue LED 13. The mixing ratio of the emitting colors of the three LEDs 11, 12 and 13 is set up in accordance with luminosity (brightness) of each of the LEDs 11, 12 and 13. Therefore, by separately controlling luminosity (brightness) of each of the LEDs 11, 12 and 13, it is possible to change the emitting color of the LED button 9, in which the multicolor LED unit 10 is incorporated, into an arbitrary color. More specifically, as will be described later, a feature of the embodiment of the present invention is a configuration for adjusting brightness or hue of the multicolor LED unit 10 incorporated in the LED button 9 in response to an operation of the user.

As shown in FIG. 2, one control line 14 is connected to each of the red LED 11, green LED 12 and blue LED 13. Therefore, a display control circuit 24 (will be described later) can output a control signal to each of the LEDs 11, 12 and 13 constituting the multicolor LED unit 10 to control on/off of each of the LEDs 11, 12 and 13 (control of lighting-up and lights-out).

The key top portion 9*a* of the LED button 9 is constructed by a member with light transparency. Therefore, the LED button 9 is a so-called illuminated operator that looks like emitting light with a color corresponding to an emitting color of the multicolor LED unit 10 when the embedded multicolor LED unit 10 emits light. In this regard, the key top portion 9*a* is not limited to one configured by a member with light transparency in its entirety, but at least a part of the key top portion 9*a* may be configured by a member with light transparency. This is because it meets the purpose of visibility by emitting of an LED.

Figure 3:
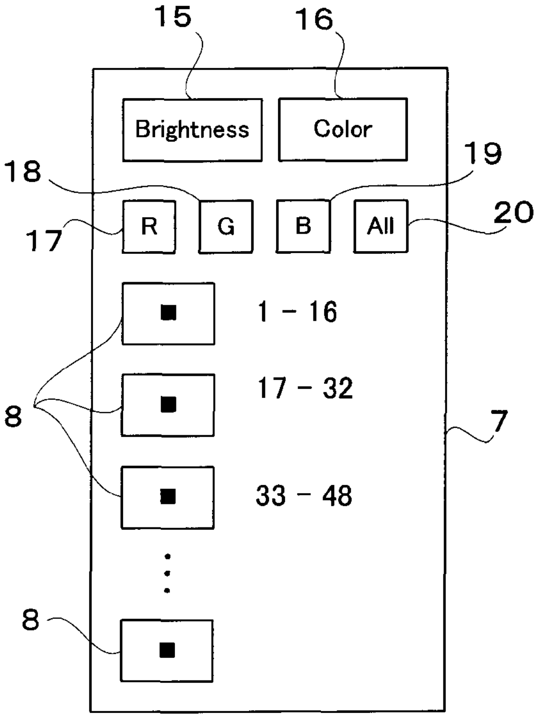
FIG. 3 is a view showing an enlarged control section provided in the audio mixing console of the digital mixer of FIG. 1.

FIG. 3 is a view showing the enlarged control section 7 shown in FIG. 1. In FIG. 3, the control section 7 includes a plurality of channel selection buttons 8, and a group of operators 15 to 20 for adjusting brightness or hue of the LED button 9.

Channel groups in each of which 16 channels are grouped are assigned into the plurality of channel selection buttons 8 one group by one group. In FIG. 3, each of character strings "1 to 16", "17 to 32", "33 to 48" . . . , described at right sides of the respective channel selection buttons 8, indicates channel numbers belonging to the channel group assigned to the corresponding channel selection button 8. In this regard, the number of channels belonging to the channel group assigned to one channel selection button 8 corresponds to the number of channel strips provided on the channel strip section 3.

In the plurality of channel selection buttons 8, one operated by the user is turned on, and the other buttons 8 are turned off. The channel selection buttons 8 function as buttons for selecting a channel to be assigned to the plurality of channel strips of the channel strip section 3 in a normal operation mode (the case where both a brightness adjusting mode and a hue adjustment mode (will be described later) are turned off). The channels belonging to the channel group assigned to the channel selection button 8, which are turned on at that time, are assigned to the respective channel strips of the channel strip section 3 one by one. In this regard, the configuration in which the channel groups assigned to the group of channel strips of the channel strip section 3 can be switched is known in the prior art of the digital audio mixer.

In FIG. 3, the brightness adjusting mode selection button (Brightness) 15 is a button for switching on/off of the brightness adjusting mode every operation of the user. In the case where the user operates the LED button 9 when the brightness adjusting mode is turned on, a brightness adjustment process (will be described later) is carried out with respect to the multicolor LED unit 10 corresponding to the operated LED button 9.

Further, the hue adjustment mode selection button (Color) 16 is a button for switching on/off of the hue adjustment mode every operation by the user. In the case where the user operates the LED button 9 when the hue adjustment mode is turned on, a hue adjustment process (will be described later) is carried out with respect to the multicolor LED unit 10 corresponding to the operated LED button 9.

Each of adjustment subject specification buttons 17, 18, 19 and 20 is a button for specifying a color of the LED (red (R), green (G) or blue (B), or all colors (ALL)), which is an adjustment subject, when the brightness adjusting mode or hue adjustment mode is turned on. In the brightness adjustment process or hue adjustment process, the user is allowed to carry out brightness adjustment or hue adjustment targeting the color (LED) corresponding to one or more of the adjustment subject specification buttons 17, 18, 19 and 20 that become an on state at that time.

FIG. 4 is a block diagram showing a summary of an electronic hardware configuration of the digital audio mixer provided with the audio mixing console 1 shown in FIG. 1. In FIG. 4, the audio mixer includes: a CPU 21; a ROM 22; a RAM 23; a display section 25 connected to a display control circuit 24; an operation section 27 connected to an operation detecting circuit 26; a communication interface (communication I/O) 29 connected to a communication control circuit 28; a sound signal interface (sound signal I/O) 31 connected to a sound signal input/output circuit 30; and a signal processing circuit (DSP) 32. Each component is connected to the CPU 21 via a communication bus 33.

The CPU 21 carries out control programs stored in the ROM 22 or RAM 23, and carries out the whole operation control of the mixer. Further, storage areas for storing work data such as various parameters used for signal processing, currently carried out by the mixer, are provided in the ROM 22 or RAM 23. A plurality of lighting control data for separately controlling lighting of the respective LEDs of the multicolor LED unit 10 that is incorporated in each of the LED buttons 9 are stored in the storage area provided in the ROM 22 or RAM 23. The lighting control data indicate brightness to cause the corresponding LED to emit light. The CPU 21 supplies a command for controlling lighting-up of the respective LEDs to the display control circuit 24 on the basis of the lighting control data stored in the ROM 22 or RAM 23.

The multicolor LED unit 10 incorporated in each of the plurality of LED buttons 9 and an LCD display 2 are included in the display section 25. The display control circuit 24 controls display of various kinds of information on the display section 25 on the basis of commands supplied from the CPU 21. Namely, the display control circuit 24 carries out lighting control of each LED of the multicolor LED unit 10 incorporated in each of the LED buttons 9.

The operation section 27 includes a plurality of operators provided on the operation panel (see FIG. 1). The operation detecting circuit 26 detects an operation of the operation section 27 by the user, and then outputs a detected signal according to the content of the detected operation to the CPU 21. The CPU 21 carries out a process according to the detected signal outputted from the operation detecting circuit 26.

The sound signal I/O 31 is constructed from an analog input port, an analog output port, and a digital input/output port. A sound signal (analog audio signal or digital audio signal) is inputted and outputted via the sound signal I/O 31. The sound signal input/output circuit 30 is constructed so as to include an A/D converter and a D/A converter. The sound signal input/output circuit 30 converts the analog audio signal inputted via the sound signal I/O 31 into a digital audio signal every predetermined sampling period to supply the converted digital audio signal to the DSP 32. The sound signal input/output circuit 30 also converts the digital audio signal outputted from the DSP 32 into an analog audio signal every predetermined sampling period to output the converted analog audio signal to the outside via the sound signal I/O 31. Further, the sound signal input/output circuit 30 can transmit and receive the digital audio signal to and from an external device via the sound signal I/O 31.

The DSP 32 subjects the digital audio signal supplied from the sound signal input/output circuit 30 to signal processing on the basis of an instruction from the CPU 21, and outputs it to the sound signal input/output circuit 30. Various parameters used for the signal processing carried out by the DSP 32 are controlled in accordance with an operation of the operation section 27 by the user.

The display control circuit 24 separately controls lighting-up of the respective LEDs constituting each multicolor LED unit 10 (LED button 9) by means of a lighting control method, which is referred to as dynamic lighting (known in the prior art), on the basis of a command supplied from the CPU 21. FIGS. 5A and 5B are views for explaining lighting operations of the multicolor LED unit 10 (LED button 9) using a dynamic lighting method. Horizontal axes thereof indicate time. FIG. 5A shows a state where a plurality (eight in an example of the drawing) of multicolor LED units 10 are turned on (or emit light) in turn every predetermined lighting period (12 milliseconds (12 ms) in an example of the drawing) by means of the dynamic lighting method.

In the example shown in FIG. 5A, since lighting of the eight multicolor LED units 10 are controlled in turn one by one at the lighting periods of 12 ms, time assigned to one multicolor LED unit 10 is 12/8 ms=1.5 ms. The display control circuit 24 controls the lighting of the eight multicolor LED units 10 within the lighting period of 12 ms in turn one by one while switching the multicolor LED units 10 of lighting control subjects every lighting period of 1.5 ms one by one. Therefore, when to focus one multicolor LED unit 10, one multicolor LED unit 10 repeats a blinking action in which it is turned on within the lighting period of 1.5 ms on the basis of lighting control and is turned off expect for the period every cycle of 12 ms.

Each of the multicolor LED units 10 repeats blinking at lighting periods (about 83 Hz) of 12 ms, and it looks, through human eyes, so that each multicolor LED unit 10 is always turned on due to an afterimage effect. Therefore, the multicolor LED unit 10 actually blinks on and off at timing shown in FIG. 5A, but it looks, through human eyes, so as to always be turned on due to the afterimage effect.

FIG. 5B is a view for explaining an operation of the lighting control of one multicolor LED unit 10 in a period of time of 1.5 ms. The display control circuit 24 controls lighting of the respective LEDs 11, 12 and 13 at the period of 1.5 ms separately on the basis of the lighting control data for each LED of the three red LED 11, green LED 12 and blue LED 13 constituting the multicolor LED unit 10.

The lighting control data for the respective LEDs 11 to 13 are data for controlling timing to turn the LEDs on and off within the period of 1.5 ms as an example. The CPU 21 supplies a command based on the lighting control data to the display control circuit 24, by which the display control circuit 24 control lighting time of the respective LEDs in the period of 1.5 ms. In this embodiment, the lighting control data are composed of a binary code with six bits to control timing to turn the LED corresponding to the lighting control data on and off on the basis of a value of "1" or "0" set up for every bit. Namely, the LED is turned on at on timing of the respective bits of the lighting control data, and the LED is turned off at off timing thereof. In the case where the lighting control data are composed of the binary code with six bits, it is possible to express 64 ways of patterns of on/off timing by combination of on/off of the respective bits. In this regard, in the case of turning the LED off, lighting time indicated by the lighting control data is zero. Namely, no bit is set to on.

For example, FIG. 5B shows an example of the on/off timing pattern in which the red LED (R) is turned on only for the lighting time for four bits, the green LED (G) is turned on only for the lighting time for three bits, and the blue LED (B) is turned on only for lighting time for two bits. The longer the lighting time of the LED for the period of 1.5 ms becomes, the more an amount of light of the case of blinking every lighting period of 12 ms becomes. For this reason, the brightness of the LED becomes higher. On the contrary, the shorter the lighting time of the LED for the period of 1.5 ms becomes, the less the amount of light of the case of blinking every lighting period of 12 ms becomes. For this reason, the brightness of the LED becomes lower. Namely, the brightness of the LED to be turned on is determined in accordance with the lighting time of the LED indicated by the lighting control data.

Now, in view of control of lighting time, timing of on/off of the LED within the period of 1.5 ms is different, but there is no need to differentiate patterns of on/off timing having the same lighting time. Thus, in the present embodiment, as shown in FIG. 6, six types of time patterns whose lighting time is different from each other are determined in advance, and any time pattern of the six types of time patterns shown in FIG. 6 is set up as the lighting control data for each of the LEDs.

Figure 6:
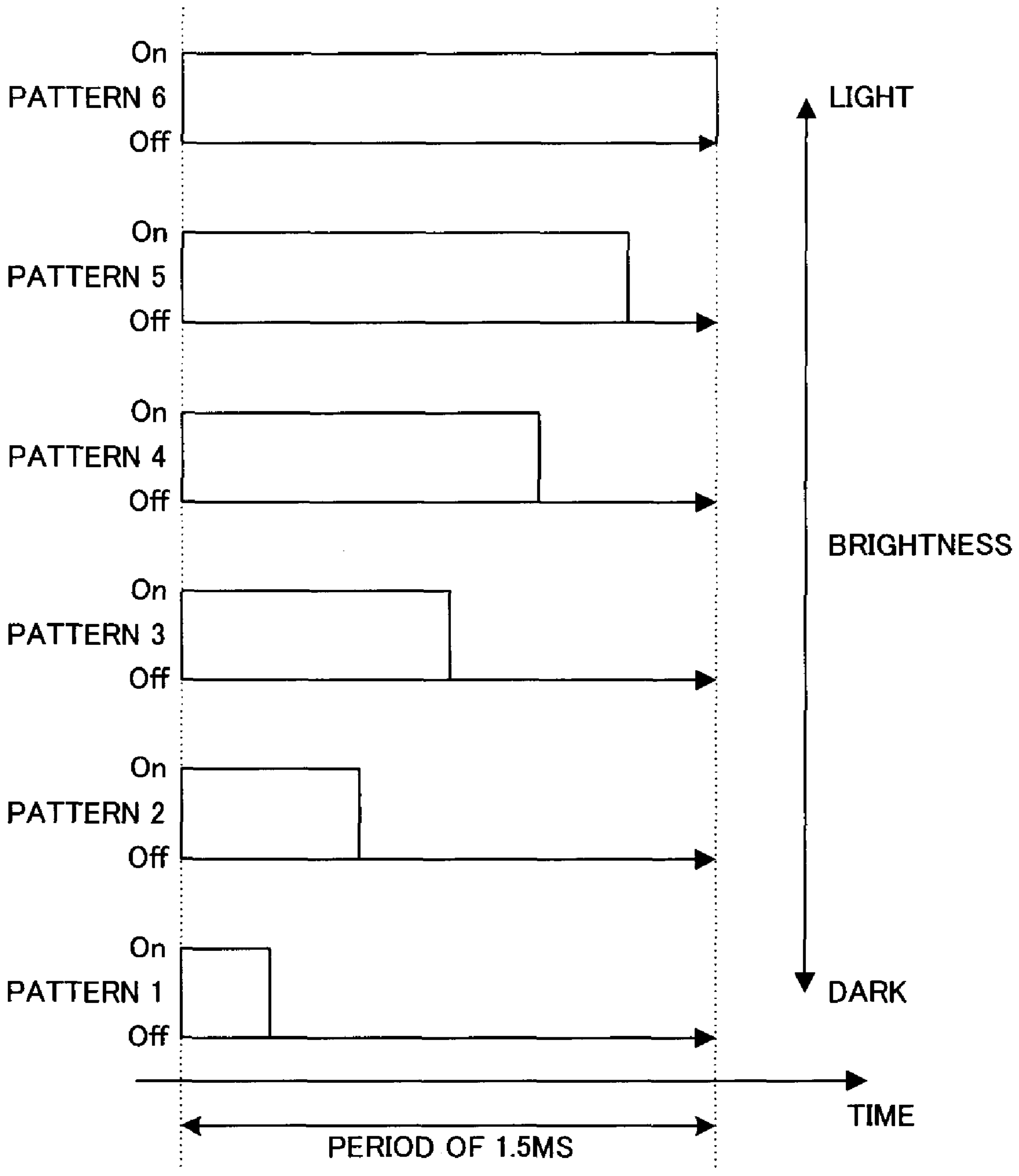
FIG. 6 is a view for explaining six types of time patterns on lighting control data for an LED.

In FIG. 6, a "pattern 6" is a time pattern in which all bits of six bits are set to on, a "pattern 5" is a time pattern in which five bits of the six bits are set to on, a "pattern 4" is a time pattern in which four bits of the six bits are set to on, a "pattern 3" is a time pattern in which three bits of the six bits are set to on, a "pattern 2" is a time pattern in which two bits of the six bits are set to on, and a "pattern 1" is a time pattern in which one bit of the six bits is set to on. In these six types of time pattern "pattern 6" to "pattern 1", the "pattern 6" is a pattern in which brightness is the highest (light). As the lighting time becomes shorter one step by one step in the numerical order, the brightness becomes lower one step by one step. The "pattern 1" is a pattern in which brightness is the lowest (dark).

In the ROM 22 or RAM 23, any one time pattern of "pattern 1" to "pattern 6" shown in FIG. 6 is stored as a current value of lighting control data for each LED. The lighting control data to be stored in the ROM 22 or RAM 23 are essentially stored in the ROM 22 or RAM 23 for each of the red LED, the green LED and the blue LED of the multicolor LED unit 10 incorporated in each of the plurality of LED buttons 9. This is because lighting of one multicolor LED unit 10 is controlled for every LED on the basis of the lighting control data for each of the red LED, the green LED and the blue LED.

On the other hand, with respect to the push-button switch 6 (LED button 9) of each channel strip of the channel strip section 3 in FIG. 1, each LED of each of the physical LED buttons 9 does not correspond to lighting control data on one-on-one level exceptionally, but a plurality of lighting control data for each LED of the LED button 9 of the channel strip are stored for every channel assigned to the channel strip in the ROM 22 or RAM 23. This is because a lighting state of the LED button 9 of each channel strip (for example, lighting-up on/off state of the LED button 9, emitting color of the LED button 9 and the like) differs depending upon the channel assigned to the channel strip at this time. For example, in the case where the channel number "1" or "17" can be assigned to one channel strip, two lighting control data containing lighting control data for the channel number "1" and lighting control data for the channel number "17" are stored in the ROM 22 or RAM 23 so as to correspond to one physical LED button 9 provided in the channel strip.

Next, one example of an operation method of adjusting brightness of the LED button 9 and one example of an operation method of adjusting hue of the LED button 9 will be described. The user first operates any of the brightness adjusting mode selection button (Brightness) 15 and the hue adjustment mode selection button (Color) 16 to switch an operation mode from a normal mode to any of the brightness adjusting mode and the hue adjustment mode.

Figure 7:
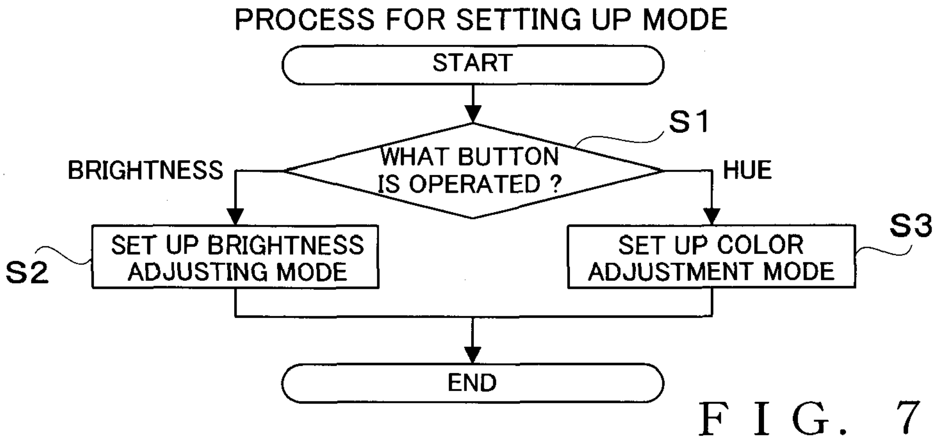
FIG. 7 is a flowchart showing procedures of a process for setting up a brightness adjusting mode or hue adjustment mode.

FIG. 7 is a flowchart showing procedures of a process, carried out by the CPU 21, for setting up the brightness adjusting mode or hue adjustment mode to be turned on. The process of FIG. 7 is initiated (or runs) when the brightness adjusting mode or hue adjustment mode is turned on by operating either the brightness adjusting mode selection button 15 or the hue adjustment mode selection button 16. When any of the brightness adjusting mode selection button 15 and the hue adjustment mode selection button 16 is operated, the CPU 21 determines that the operated button is any of the brightness adjusting mode selection button 15 and the hue adjustment mode selection button 16 (Step S1). In the case where it is determined that the operated button is the brightness adjusting mode selection button 15, the CPU 21 sets up the brightness adjusting mode to on (Step S2). Further, in the case where it is determined that the operated button is the hue adjustment mode selection button 16, the CPU 21 sets up the hue adjustment mode to on (Step S3).

When the normal operation mode is turned on, both the brightness adjusting mode and the hue adjustment mode are in an off state. When any one of the brightness adjusting mode selection button 15 and the hue adjustment mode selection button 16 is operated at this state, the CPU 21 switches the operation mode of the audio mixing console 1 into the brightness adjusting mode or hue adjustment mode corresponding to the operated button 15 or 16 at Step S2 or Step S3.

On/off states of the brightness adjusting mode selection button 15 or the hue adjustment mode selection button 16 are switched every one operation, and only any one of the two exclusively becomes an on state. Thus, any one of the buttons 15 and 16 is in an on state. When the other button in an off state is operated, at Step S2 or Step S3, the mode corresponding to the operated button is switched from off to on, and the mode that has been in the on state until just before is switched to off. Further, when the button 15 or 16 corresponding to the mode that is in the on state is operated in the state that any one of the brightness adjusting mode and the hue adjustment mode is turned on, the mode is switched from on to off, and the operation mode is thus switched to the normal mode.

<Brightness Adjustment Mode>

In the case of adjusting brightness (luminosity) of the LED button 9, the user first operates the brightness adjusting mode selection button (Brightness) 15, and turns the brightness adjusting mode on by the processes of FIG. 7 described above. The user then uses the adjustment subject specification buttons 17, 18, 19 and 20 to specify a color (LED) as an adjustment subject, and operates the LED button 9 to adjust brightness of the color (LED) of the adjustment subject in the multicolor LED unit 10 corresponding to the operated LED button 9.

Figure 8:
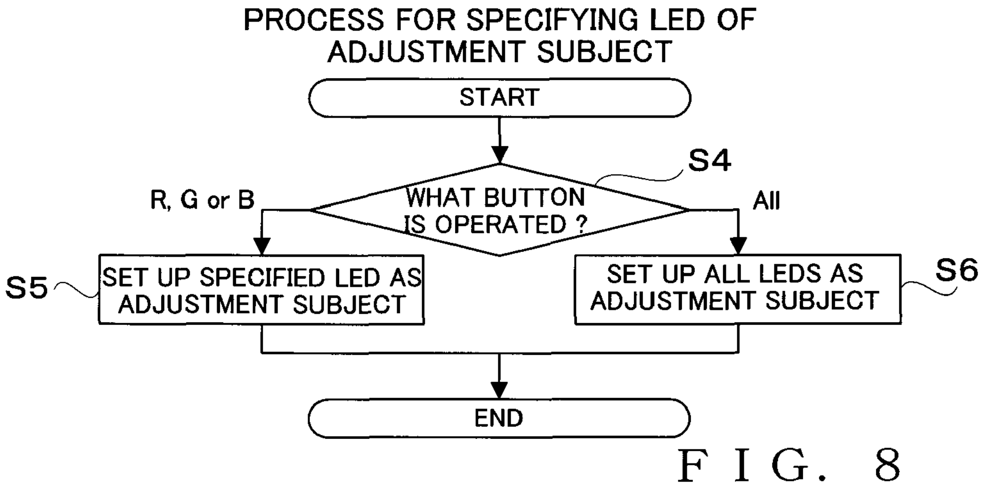
FIG. 8 is a flowchart showing procedures of a process for specifying a color (LED) of the adjustment subject.

FIG. 8 is a flowchart showing procedures of a process, carried out by the CPU 21, for specifying a color (LED) that is to become an adjustment subject. The process of FIG. 8 is initiated (or runs) when any one of the adjustment subject specification buttons 17, 18, 19 and 20 is operated at the state where the brightness adjusting mode or hue adjustment mode is turned on. Namely, an operation of each of the adjustment subject specification buttons 17, 18, 19 and 20 is effective only at a state where the brightness adjusting mode or the hue adjustment mode is turned on. This is because an operation to specify a subject color is not carried out when an operation mode is the normal mode.

In the case where any of the adjustment subject specification buttons 17, 18, 19 and 20 is operated, the CPU 21 determines which is the operated button in the adjustment subject specification buttons 17, 18, 19 and 20 (Step S4). In the case where the operated adjustment subject specification button is the button 17, 18 or 19 specifying red (R), green (G) or blue (B), the CPU 21 sets up the LED of the specified color as the adjustment subject (Step S5). Further, in the case where the operated adjustment subject specification button is the button 20 specifying all colors (ALL), the CPU 21 sets up the LEDs of all of the RGB colors as the adjustment subject (Step S6). Any one of the adjustment subject specification buttons 17, 18, 19 and 20 becomes the on state exclusively. Accordingly, when a new adjustment subject is set up at Step S5 or S6, the color that has been specified as the adjustment subject until just before is not the adjustment subject.

The user uses the adjustment subject specification buttons 17, 18, 19 and 20 to specify the color (LED) of the adjustment subject, and then operates the LED button 9 to adjust brightness of the color (LED) of the adjustment subject in the multicolor LED unit 10 corresponding to the operated LED button 9.

Figure 9:
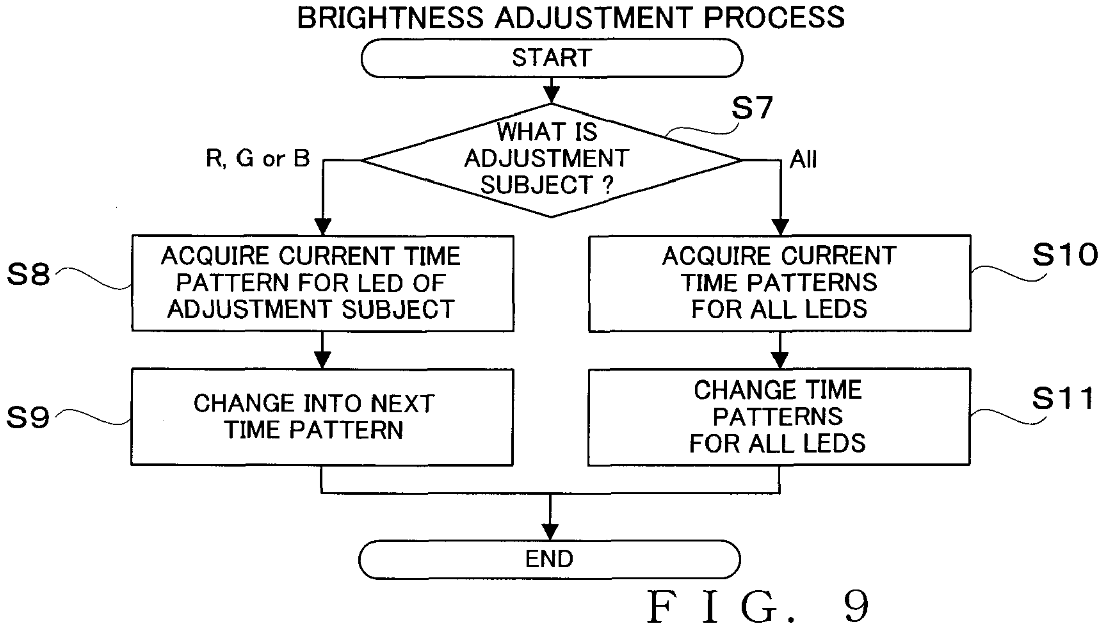
FIG. 9 is a flowchart showing procedures of a brightness adjustment process.

FIG. 9 is a flowchart showing procedures of a process, carried out by the CPU 21, for changing brightness of the color (LED) specified as the adjustment subject in the brightness adjusting mode. The process of FIG. 9 is initiated (or runs) whenever the user presses the LED button 9 corresponding to the multicolor LED unit 10 for carrying out the brightness adjustment once. When the LED button 9 is operated, the CPU 21 determines whether the color (LED) of the adjustment subject specified in the process of FIG. 8 is any one color of red (R), green (G) and blue (B), or all colors (ALL) (Step S7). This is because a subsequent process differs depending upon whether the specified adjustment subject is one color or all colors.

In the case where the specified adjustment subject is any one color (any one LED) of red (R), green (G) and blue (B), the CPU 21 acquires a value (time pattern) of the lighting control data for the color (LED) of the adjustment subject in the multicolor LED unit 10 corresponding to the operated LED button 9 from the ROM 22 or RAM 23 (Step S8). For example, in the case where red is specified as the adjustment subject, the CPU 21 acquires a current value of the lighting control data for the red LED in the multicolor LED unit 10 corresponding to the operated LED button 9 from the ROM 22 or RAM 23. The current value of the lighting control data acquired here corresponds to brightness of the color in the multicolor LED unit 10 at this time.

The CPU 21 changes the value of the lighting control data for the color (LED) of the adjustment subject, acquired at Step S8 into the time pattern in which brightness is higher by one step (see FIG. 6) (Step S9). The CPU 21 rewrites the content stored in the ROM 22 or RAM 23 in accordance with a change in the value of the lighting control data. Thus, the brightness of the color (LED) of the adjustment subject in the multicolor LED unit 10 corresponding to the operated LED button 9 is increased by one step.

Further, in the case where the specified adjustment subject is the all colors (three LED), the CPU 21 acquires lighting control data for the three LEDs constituting the multicolor LED unit 10 corresponding to the operated LED button 9 from the ROM 22 or RAM 23 (Step S10). The CPU 21 then changes the values of the lighting control data for the respective LEDs acquired at Step S10 described above into corresponding patterns in which brightness is higher (light) by one step (Step S11). The CPU 21 rewrites the content stored in the ROM 22 or RAM 23 in accordance with a change in the value of the lighting control data. Thus, values of the lighting control data for three LEDs of the multicolor LED unit 10 corresponding to the operated LED button 9 are changed at the same time, and brightness (luminosity) of the multicolor LED unit 10 is increased by one step. Namely, a difference between the processes at Step S10 and Step S11 and the processes at Step S8 and Step S9 is a point whether to process the lighting control data for one color specified as the adjustment subject or to process the lighting control data for all colors (for three LEDs).

<Method of Operating the LED Buttons One by One>

In the brightness adjusting mode, as one example of an operation method of the brightness adjustment of the LED, there is a method of adjusting brightness of a color (LED) of an adjustment subject in the multicolor LED unit 10 incorporated in the LED button 9 by operating the LED button 9 itself having the color (LED) of the adjustment subject. In this case, the multicolor LED unit 10 incorporated in the operated LED button 9 corresponds to the "multicolor LED unit 10 corresponding to the LED button 9". The user is allowed to adjust brightness of each LED in the multicolor LED unit 10 incorporated in the LED button 9 one by one separately with respect to the plurality of LED buttons 9 provided in the audio mixing console 1.

In the case where the adjustment subjects are specified one color by one color (the adjustment subject specification buttons 17, 18 and 19 are turned on in turn), the CPU 21 carries out the processes at Steps S8 and S9 when the user presses each of the LED buttons 9 once while viewing a change condition of the brightness, thereby increasing brightness of the color of the adjustment subject one step by one step. When a color (LED) specified for the adjustment subject becomes desired luminosity by means of an operation of the LED button 9, the user terminates the operation of the LED button 9. By carrying out this work for the plurality of LED buttons 9, it is possible to acquire luminosity based on user's preference for every LED of each of the LED buttons 9. According to this method, for example, it is possible to correct variation in brightnesses of the respective LEDs among the plurality of LED buttons 9 by adjusting brightnesses of the other LED buttons 9 for every LED on the basis of brightness of one LED button 9.

Further, in the case of specifying all colors as the adjustment subject (in the case where the adjustment subject specification button 20 is turned on), the CPU 21 carries out the processes at Steps S10 and S11 whenever the LED button 9 is operated once, thereby increasing luminosity of all LEDs of the multicolor LED unit 10 incorporated in the LED button 9 one step by one step. Therefore, in this case, the user can change luminosity of the multicolor LED unit 10 by adjusting brightness of the whole multicolor LED unit 10. When the LED button 9 becomes desired luminosity, the operation of the LED button 9 is terminated. By carrying out this work for the plurality of LED buttons 9, it is possible to acquire luminosity based on user's preference for every LED button 9. In the case where the user wants to correct variation in brightness of the whole multicolor LED unit 10 among the plurality of LED buttons 9, this method is suitable.

<Method of Using Channel Selection Button>

As another example of the operation method in the brightness adjusting mode, there is a method of changing brightness using the channel selection button 8 of the control section 7. As described above, the channel selection button 8 functions as a button for selecting a channel group assigned to the plurality of channel strips of the channel strip section 3 in a normal operation mode. On the other hand, the channel selection button 8 functions as a button for adjusting brightness of a color (LED) of the adjustment subject specified by the adjustment subject specification buttons 17, 18, 19 and 20 in the multicolor LED unit 10, which is incorporated in the LED button 9 (push-button switch 6) provided in each channel strip of the channel strip section 3, when the brightness adjusting mode is turned on.

In the case of adjusting brightness using the channel selection button 8, the CPU 21 acquires, from the ROM 22 or RAM 23, values of the lighting control data (that is, a plurality of lighting control data for a plurality of channels) for the LEDs set up for every channel belonging to a channel group corresponding to the operated channel selection button 8 with respect to the color specified to the adjustment subject (LED for one color or LEDs for all colors) whenever the channel selection button 8 is operated once, and changes the value of each of the acquired lighting control data into a time pattern that the brightness is higher by one step. In this case, the multicolor LED unit 10 incorporated in the LED button 9 (push-button switch 6) of each channel strip of the channel strip section 3 corresponds to the "multicolor LED unit 10 corresponding to the operated LED button 9".

Therefore, the user is allowed to heighten brightness of the LED button 9 (push-button switch 6) of each channel strip, which actually emits light at that time, one step by one step at the same time whenever the channel selection button 8 is operated. Namely, by operating one channel selection button 8, it is possible to adjust brightness of the color (LED for one color or LEDs for all colors) of the adjustment subject in a lump with respect to the plurality of LED buttons 9 (push-button switch 6) other than the channel selection button 8. By carrying out this work for the plurality of channel selection buttons 8, it is possible to adjust brightness of the LED button 9 (push-button switch 6) when the respective channels corresponding to the respective channel selection buttons 8 are called up in the channel strip.

In this regard, here, it is assumed to operate the channel selection button 8 corresponding to the channel group assigned to each channel strip of the channel strip section 3 at that time. This is because it is natural that the brightness adjustment of the LED is carried out while visibly recognizing a lighting state of the LED button 9 that is turned on at this time.

In this regard, in the case where the brightness adjustment is carried out using channel selection buttons 8 other than the channel selection button 8 (which is in an on state) corresponding to the channel group assigned to the channel strip section 3 at this time, for example, the group of channels assigned to the channel strip section 3 may be switched by means of a first operation of the channel selection button 8, and brightness adjustment is started after a next operation.

As described above, in the "brightness adjusting mode", a beneficial effect can be achieved that brightness of each of the LEDs 11 to 13 constituting the multicolor LED unit 10 can be adjusted in response to an operation of the user for every LED button 9 in which the multicolor LED unit 10 is incorporated in the audio mixing console. For example, this makes it possible to adjust brightnesses of the other LED buttons 9 for every LED on the basis of brightness of one LED button 9 and to easily modify variation in brightnesses of the respective LEDs among the plurality of LED buttons 9. Moreover, this work of brightness adjustment can be carried out only by initiating (or activating) the brightness adjusting mode, specifying a color of the adjustment subject and then operating the operator corresponding to the multicolor LED unit 10 that the user wants to carry out the brightness adjustment. For this reason, the work can be carried out by a method as easy as possible and that can be understood by the user. Further, since a mechanism to automatically measure lighting state of the LED and the like are not required, the function of brightness adjustment can be achieved without costs.

<Hue Adjustment Mode>

Next, the "hue adjustment mode" will be described.

In the case of adjusting a hue (color phase) of the LED button 9, the user first operates the hue adjustment mode selection button 16 to turn the hue adjustment mode on (the process of FIG. 7 described above). The user then operates any of the adjustment subject specification buttons 17, 18, 19 and 20 to specify a color (LED) of the adjustment subject, and operates the LED button 9 to adjust hue of the color (LED) of the adjustment subject in the multicolor LED unit 10 corresponding to the operated LED button 9. Processes for specifying a color of the adjustment subject, carried out by the CPU 21 in response to operations of the adjustment subject specification buttons 17, 18, 19 and 20 are similar to ones that have been described with reference to FIG. 8 as described above. For this reason, its explanation is omitted by incorporating the above explanation.

Figure 10A:
FIGS. 10A and 10B are views for explaining a state of a change in RGB balance when a color of the multicolor LED unit is changed in the hue adjustment mode.
Figure 10B:
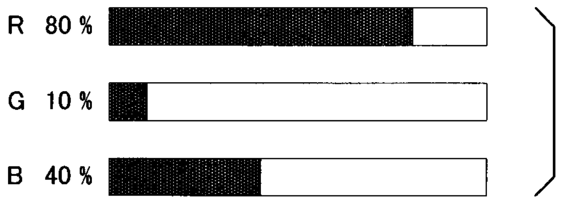

In the hue adjustment mode, brightness of the color (LED) specified to the adjustment subject in the multicolor LED unit 10 corresponding to the LED button 9 is heightened in accordance with an operation of the LED button 9, an RGB balance of the multicolor LED unit 10 is changed by lowering brightness of the other colors (LEDs), and hue of an emitting color of the multicolor LED unit 10 (LED button 9) is thus adjusted. FIGS. 10A and 10B are views for explaining a state of a change in RGB balance when a hue of an emitting color of the multicolor LED unit 10 is changed in the hue adjustment mode.

In the case where a state that an LED with each color in the multicolor LED unit 10 is turned on with the maximal brightness is expressed by 100% in FIGS. 10A and 10B, FIG. 10A illustrates a state that the red LED (R), the green LED (G) and the blue LED (B) in the multicolor LED unit 10 are respectively turned on with brightnesses of 70%, 20% and 50%. In the case where red is specified as a color of the adjustment subject at this state, a balance of RGB is changed from the state of FIG. 10A to the state of FIG. 10B in response to an operation of the LED button 9. In FIG. 10B, compared with those in FIG. 10A, brightness of red of the adjustment subject is heightened by 10%, and brightness of each of green and blue is lowered by 10%. Thus, hue of the emitting color is changed so that redness becomes stronger in the whole multicolor LED unit 10. Thus, by changing the RGB balance of the multicolor LED unit 10 in response to an operation of the LED button 9, that is, by changing the ratio of brightnesses of the red LED, the green LED and the blue LED, it is possible to arbitrarily create and adjust hue of the emitting color of the multicolor LED unit 10. In this regard, in the specification of this application, "hue" is a term (word) specifying a color (color phase) created by combination of the colors of the red LED, the green LED and the blue LED.

Figure 11:
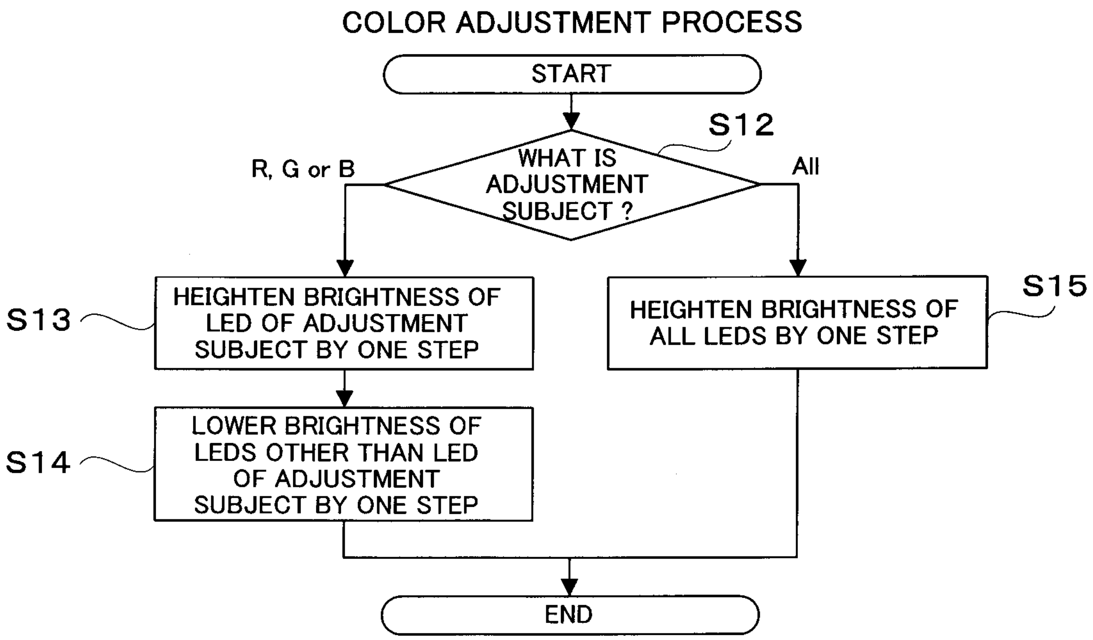
FIG. 11 is a flowchart showing procedures of a hue adjustment process.

FIG. 11 is a flowchart showing procedures of a process, carried out by the CPU 21, for changing a hue of the color (LED) specified as the adjustment subject in the hue adjustment mode. The process of FIG. 11 is initiated (or runs) whenever the user presses the LED button 9 corresponding to the multicolor LED unit 10 for carrying out the hue adjustment once. The CPU 21 determines whether the color (LED) of the adjustment subject specified in the process of FIG. 8 is any one color of red (R), green (G) and blue (B) or all colors (ALL) (Step S12). This is because a subsequent process differs depending upon whether the specified adjustment subject is one color or all colors.

In the case where the adjustment subject is specified one color by one color (that is, in the case where adjustment subject specification button 17, 18 or 19 is turned on), the CPU 21 changes the value of the lighting control data for the color (LED) of the adjustment subject in the multicolor LED unit 10 corresponding to the operated LED button 9 into a pattern in which the brightness is heightened by one step (Step S13), and respectively changes the values of the lighting control data for the colors (LEDs) other than the adjustment subject into patterns in each of which the brightness is lowered by one step (Step S14). The CPU 21 rewrites the content stored in the ROM 22 or RAM 23 in response to the change in the values of the lighting control data. Namely, whenever the LED button 9 is operated once, the CPU 21 carries out Steps S13 and S14, whereby the CPU 21 changes the ratio of the brightnesses of the plurality of LEDs constituting the multicolor LED unit 10 in the multicolor LED unit 10 corresponding to the LED button 9 operated by the user so that brightness of the color (LED) specified as the adjustment subject becomes relatively high (see FIG. 10).

In this regard, the hue adjustment mode is designed to adjust hue of the specified color by causing brightness of the LED corresponding to the color specified as the adjustment subject to become relatively high and changing a ratio of brightnesses of the plurality of LEDs constituting the multicolor LED unit 10. For this reason, the adjustment subject specification button 20 is not essentially used (that is, all colors are not specified as the adjustment subject). This is because the hue of the emitting color of the multicolor LED unit 10 does not change and the whole luminosity is increased in that case.

However, since this is related to a usage method of a user, processes carried out by the CPU 21 when the adjustment subject specification button 20 is operated are illustrated in FIG. 11. Namely, in the case where all colors are specified as the adjustment subject (in the case where the adjustment subject specification button 20 is turned on), the CPU 21 carries out a process for respectively changing values of the lighting control data for the three LEDs (all colors of red (R), green (G) and blue (B)) constituting the multicolor LED unit 10 corresponding to the operated LED button 9 into patterns in each of which brightness is heightened by one step (Step S15), thereby increasing the brightness of the multicolor LED unit 10 in whole.

As well as the explanation that has been described for the brightness adjusting mode, an operation method in the hue adjustment mode can be any method of a method of adjusting hue of the multicolor LED unit 10 incorporated in the operated LED button 9 in response to an operation of the LED button 9 (that is, a method of operating the LED button 9 one by one) and a method of changing hue of the multicolor LED unit 10 incorporated in the LED button 9 of each channel strip of the channel strip section 3 in response to an operation of the channel selection button 8 (that is, a method of using the channel selection button 8).

In the case of the "method of operating the LED button 9 one by one", the CPU 21 carries out the processes at Steps S13 and S14 whenever the LED button 9 is operated once by the user, thereby changing hue of the LED button 9. The user visibly recognizes a change condition of the hue, and adjusts the hue of the LED button 9 while changing the color of the adjustment subject as needed. When the LED button 9 becomes desired hue, the operation of the LED button 9 is terminated. By carrying out this work for the plurality of LED buttons 9, it is possible to acquire hue based on user's preference for every LED button 9. Namely, the emitting color of each of the LED buttons 9 can be set up to arbitrary hue.

Further, in the case of the "method using the channel selection button 8", the CPU 21 acquires, from the ROM 22 or RAM 23, values of the lighting control data (that is, a plurality of lighting control data for a plurality of channels) for the LEDs set up for every channel belonging to a channel group corresponding to the operated channel selection button 8 with respect to the color specified to the adjustment subject (LED for one color or LEDs for all colors) whenever the channel selection button 8 is operated once, changes the value of each of the acquired lighting control data into a time pattern that the brightness is higher by one step (Step S13), and changes the value of each of the lighting control data for the colors (LED) other than the adjustment subject into a time pattern that brightness is lower by one step (Step S14). In this case, the multicolor LED unit 10 incorporated in the LED button 9 (push-button switch 6) of each channel strip of the channel strip section 3 corresponds to the "multicolor LED unit 10 corresponding to the operated LED button 9".

Therefore, the hue of the LED button 9 (push-button switch 6) of each channel strip, which actually emits light at that time, is changed whenever the channel selection button 8 is operated by the user. Namely, by operating one channel selection button 8, the user can adjust hue of the color (LED for one color or LEDs for all colors) of the adjustment subject in a lump with respect to the plurality of LED buttons 9 (push-button switch 6) other than the channel selection button 8. In this regard, here, it is assumed to operate the channel selection button 8 corresponding to the channel group assigned to each channel strip of the channel strip section 3 at that time. However, as well as the explanation for the brightness adjustment described above, it is also possible to adjust the hue using the channel selection buttons 8 other than the channel selection button 8 (which is in an on state) corresponding to the channel group assigned to the channel strip section 3 at this time.

As described above, in the "hue adjustment mode", a beneficial effect can be achieved that hue of the emitting color can be arbitrarily created in response to an operation of the user for every LED button 9 in which the multicolor LED unit 10 is incorporated and the hue can be adjusted in response to an operation of the user. This makes it possible for the user himself or herself to set up the emitting color of each LED button 9 uniquely and to create an environment that is easy for the user to operate. Further, since the adjustment of hue is carried out for every LED by specifying the color of the adjustment subject, it is possible to easily modify variation in hue among the plurality of LED operators caused by variation in light-emitting properties of the respective LEDs. Moreover, this work of hue adjustment can be carried out only by initiating (or activating) the hue adjustment mode, specifying a color of the adjustment subject and then operating the operator corresponding to the multicolor LED unit that the user wants to carry out the hue adjustment. For this reason, it can be carried out by a method as easy as possible and that can be understood by the user.

In this regard, the example that the six types of patterns is determined in advance for the lighting control data with six bits in FIG. 6 described above and the six types of time patterns are switched in turn every operation of the LED button 9 in the "brightness adjusting mode" and the "hue adjustment mode" has been described. However, it may be configured so that all of the 64 ways of patterns that can be expressed by the lighting control data with six bits can be used. In short, the brightness of the LED corresponding to the lighting control data may be changed by changing the lighting time indicated by the lighting control data. Further, the size of the lighting control data (the number of bits) is not limited to six bits.

Further, as for the brightness adjusting mode, it may be configured so that, in the case where the lighting control data reach the maximal value in the processes to change the lighting control data at Step S9 and Step S11 of FIG. 9 described above into ones in which brightness is higher one step by one step, an operation of the LED button 9 thereafter becomes void (that is, the value is not changed thereafter). Alternatively, it may be configured so that the value returns to the minimal value.

Further, as for the hue adjustment mode, at Step S13 and Step S15 of FIG. 11 described above, the processes for changing the lighting control data for the color of the adjustment subject every operation of the LED button 9 into one in which brightness is higher one step by one step and changing the lighting control data for the other colors into ones in each of which brightness is lower one step by one step has been described. However, it is not limited to the configuration in which the color of the adjustment subject is heightened and the other colors are lowered at the same time in this manner. It may be configured so that only the process for changing the lighting control data for the color of the adjustment subject into one in which brightness is higher one step by one step (process for heightening the color of the adjustment subject). Further, in that case, it may be configured so that the lighting control data for the colors other than the adjustment subject are lowered to ones in each of which the brightness is lower one step by one step (that is, weaken the colors other than the adjustment subject) after the lighting control data for the color of the adjustment subject reach the maximal value.

Further, FIG. 3 showed the configuration example in which the brightness adjusting mode selection button 15, the hue adjustment mode selection button 16 and the adjustment subject specification buttons 17, 18, 19 and 20 are provided in the control section 7, that is, the configuration example in which the operators for brightness adjustment or hue adjustment in the LED button 9 are provided as physical operators. However, these operators 15 to 20 for brightness adjustment or hue adjustment in the LED button 9 are limited to ones provided on the operation panel as the physical operators. The operators 15 to 20 may be configured by operator images for brightness adjustment or hue adjustment of the LED button 9 by displaying images of these operators for brightness adjustment or hue adjustment of the LED button 9 on the LCD display 2.

Further, the configuration example in which the lighting time of the LED as the adjustment subject is changed by changing the time pattern indicated by the lighting control data in response to an operation of the LED button 9 and the brightness or hue of the multicolor LED unit 10 is thereby changed, that is, a configuration example in which the brightness of the LED is changed by not changing a voltage value for the lighting control data but changing the time pattern has been described in the embodiment described above. However, it is not limited to this configuration, and it may be configured so that the brightness or hue of the multicolor LED unit 10 is changed by changing the voltage value for the lighting control data in response to an operation of the LED button 9. In this case, lighting-up of each of the LEDs 11 to 13 of the multicolor LED unit 10 is controlled to be brightness according to the voltage value indicated by the corresponding lighting control data. In the case of the brightness adjustment, the CPU 21 carries out the processes at Steps S8 and S9 or Steps S10 and S11 of FIG. 9 described above in response to an operation of the user. On the other hand, in the case of the hue adjustment, the CPU 21 carries out the processes at Steps S13 and S14 of FIG. 11 described above. Thus, the voltage value indicated by the lighting control data for the LED as the adjustment subject is changed, thereby adjusting brightness of the LED. Even this configuration, it is possible to change the brightness or hue of the multicolor LED unit 10. The change in the voltage value is carried out so that the voltage value is increased by 10% in a stepwise manner every one operation of the LED button 9, for example.

Moreover, by configuring the audio mixing console 1 provided with the operators to cause the user to select either changing of the time pattern of the lighting control data or changing of the voltage value in response to an operation of the LED button 9, it may be configured so that the user can select changing of the time pattern indicated by the lighting control data or changing of the voltage value. A concrete configuration example may be a configuration an operator for selecting changing of the pattern of the lighting control data and an operator for selecting changing of the voltage value are provided on an operation panel such as the control section of FIG. 3, for example, as physical operators, or these operators may be configured by operator images displayed on the LCD display 2. Further, in the case where the operators including the operator for selecting changing of the pattern of the lighting control data and the operator for selecting changing of the voltage value are provided, the brightness adjusting mode selection button 15 and the hue adjustment mode selection button 16 may not be provided. In this case, this is because an instruction to turn the brightness adjusting mode or hue adjustment mode on can substantially be carried out using the operator for selecting changing of the pattern of the lighting control data and the operator for selecting changing of the voltage value.

Further, in the embodiment described above, the LED button 9 composed of the push-button switch in which the multicolor LED unit is incorporated has been illustrated as a configuration example of the LED operator (see FIG. 2), but the configuration of the LED operator is not limited to this. Namely, an operation form of the LED button 9 is not limited to the push-button switch shown in the above embodiment, and the present invention can be applied even to any type of operator such as a knob type operator (control knob) to be operated in a rotational manner and a level operator (slider) to be operated in a sliding manner. In the case of the knob type operator, brightness or hue of the corresponding multicolor LED unit 10 may be changed in accordance with its rotational position or rotational operation. In the case of the fader type operator, brightness or hue of the corresponding multicolor LED unit 10 may be changed in accordance with its operation position or sliding operation. Further, the LED operator is not limited to an illuminated operator in which the multicolor LED unit 10 is incorporated in the corresponding operator itself. For example, even in one provided in the vicinity of the operator or the like, the "LED operator in which the multicolor LED unit is incorporated" according to the present invention is included.

Further, in the embodiment described above, it has been described that only any one of the adjustment subject specification buttons 17, 18, 19 and 20 becomes anon state exclusively, but it may be configured so that two or more buttons of the adjustment subject specification buttons 17, 18 and 19 for specifying the adjustment subject for every color can be turned on at the same time. In other words, it may be configured so that two colors can be specified as the adjustment subject. In this case, the CPU 21 sets up the LEDs corresponding to the specified two colors as the adjustment subject at Step S5 described above, and changes each of the lighting control data corresponding to the specified two colors, in which brightness is higher, at Steps S8 and S9 described above in the case of the brightness adjusting mode. Further, in the case of the hue adjustment mode, the CPU 21 heightens brightness of each of the lighting control data for the specified two colors at Steps S13 and S14 described above, and lowers brightness indicated by the lighting control data for the LED corresponding to the color other than the specified colors.

Further, in the embodiment described above, the configuration in which brightness or hue of the multicolor LED unit 10 is adjusted by operating the LED button 9 itself corresponding to the multicolor LED unit 10 that the user wants to adjust the brightness or hue has been described. However, in this case, the LEDs with three colors in the multicolor LED unit 10 must be specified one by one for adjustment of the respective colors.

Figure 12:
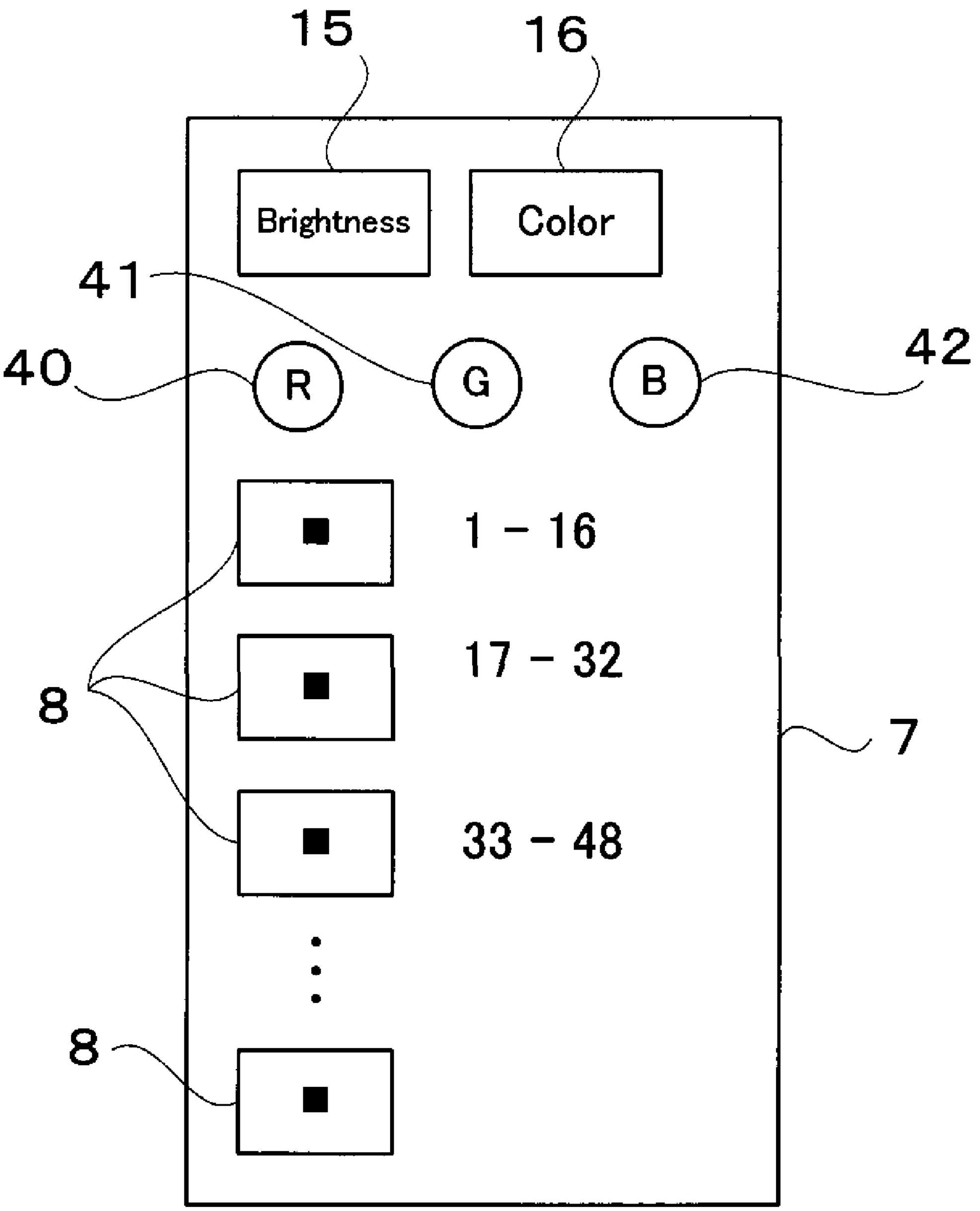
FIG. 12 is a view for explaining a configuration in which brightness or hue adjustment operators are provided in place of the adjustment subject specification buttons in the control section shown in FIG. 3 according to another embodiment of the present invention.

Another configuration example regarding this point will be described with reference to FIG. 12. FIG. 12 shows a changed example of the control section 7 shown in FIG. 3. In FIG. 12, in place of the adjustment subject specification buttons 17 to 20 shown in FIG. 3, three brightness or hue adjustment operators (operators for adjusting brightness or color) 40, 41 and 42 corresponding to the respective colors of the LEDs with three colors are provided. Each of the operators 40, 41 and 42 is constructed by a knob type operator (rotary encoder) to be operated in a rotational manner, for example. In this case, in the brightness adjusting mode or the hue adjustment mode, when to specify the LED button 9 corresponding to the multicolor LED unit 10 that the user wants to adjust brightness or hue thereof, in response to an operation of the specification, the CPU 21 carries out a process to assign the lighting control data for three LEDs of the multicolor LED unit 10 corresponding to the specified LED button 9 to the corresponding brightness or hue adjustment operators 40, 41 and 42. Then, in response to an operation of each of the three brightness or hue adjustment operators 40, 41 and 42, the CPU 21 changes brightness indicated by the lighting control data assigned to each of the operators 40, 41 and 42. Thus, the user can separately adjust brightness or hue of the LEDs with the three colors of the multicolor LED unit 10 corresponding to the specified LED button 9.

As an example of the operation method in the case where the LED button 9 is push-button switch, a method is possible in which brightness or hue adjustment for the LED button 9 can be carried out by operating the brightness or hue adjustment operators 40, 41 and 42 at the state where the LED button 9 is kept to be pressed and the brightness or hue adjustment for the LED button 9 is terminated by releasing depression of the LED button 9.

Moreover, in this case, it may be configured so that the brightness or hue of the LEDs with three colors can be adjusted in a lump in response to an operation of the brightness or hue adjustment operator by assigning the lighting control data for the LEDs with three colors to any one of the brightness or hue adjustment operators 40, 41 and 42 in a lump.

In this regard, an operation form of the three brightness or hue adjustment operators corresponding to the LEDs of three colors described above is not limited to the knob type operator, and it may be any form such as a push-button switch and a fader type operator. Further, it is not limited to a configuration in which a dedicated operator is provided as the brightness or hue adjustment operators 40, 41 and 42. It may be configured so that operators essentially applied to other purpose function as the brightness or hue adjustment operators 40, 41 and 42 only when the brightness adjusting mode or hue adjustment mode is turned on.

Further, in the "method using the channel selection button 8" that has been explained as another example of the operation method in the brightness adjusting mode or hue adjustment mode, the example that the user operates the "channel selection button 8" has been mentioned. However, the operator operated by the user is not limited to the "channel selection button 8". Any operator is permissible so long as brightness adjustment or hue adjustment for the predetermined plurality of LED buttons 9 other than the operated operator is carried out in response to an operation of the operator by the user. Further, in this method, since brightness or hue for the plurality of LED buttons 9 other than the operator operated by the user is adjusted, there is no need that the operator operated by the user itself must be the LED button 9.

In the embodiment described above, the example that the audio mixing console 1 according to the present invention constitutes the operation panel of a digital audio mixer that includes a DSP for mixing processes within housing, that is, the configuration that the audio mixing console itself includes the sound signal I/O 31 and the DSP 32 required for mixing of audio signals has been described (see FIG. 4). However, the present invention may be applied to an audio mixing console constructed by separate devices for the respective functions, including a DSP device having a DSP for carrying out signal processing, an input/output device having functions of a sound signal I/O and the like, and constituting a mixing system in which the devices are connected to each other via a network.

Further, the present invention can also be applied to an audio mixing console for an analog audio mixer in addition to the digital audio mixer.

What is claimed is:

1. An audio mixing console, comprising:

a plurality of operators including a plurality of LED operators, a multicolor LED unit being incorporated in each LED operator, the multicolor LED unit including a plurality of LEDs corresponding to a predetermined plurality of colors as one set;

a memory for storing lighting control data respectively corresponding to the plurality of LEDs constituting the multicolor LED unit, the lighting control data indicating brightness to cause the corresponding LEDs to be turned on;

a lighting control section for controlling lighting of the plurality of LEDs constituting the multicolor LED unit on the basis of each of the lighting control data stored in the memory;

an operation mode switching section for switching, in response to an operation of a user, an operation mode of the audio mixing console to a brightness adjusting mode for adjusting brightness of the multicolor LED unit;

an adjustment subject specifying section for specifying, in response to an operation of the user, at least any one of the predetermined plurality of colors constituting the multicolor LED unit as a color of the adjustment subject; and a brightness adjusting section for changing brightness, indicated by the lighting control data stored in the memory, of the LED corresponding to the color specified by the adjustment subject specifying section in the multicolor LED unit incorporated in the LED operator corresponding to the operated operator when the user operates any one of the plurality of operators in the brightness adjusting mode.

2. The audio mixing console as claimed in claim 1, wherein the lighting control data stored in the memory are composed of data indicating brightness to cause the corresponding LED to be turned on by a time pattern, the time pattern defining length of time to cause an LED to be turned on within a predetermined period of time, wherein the lighting control section carries out control for causing each of the plurality of LEDs constituting the multicolor LED unit to turn on and off on the basis of the time pattern indicated by the lighting control data stored in the memory every lighting period longer than the predetermined period of time, and wherein the brightness adjusting section changes the time pattern indicated by the lighting control data stored in the memory in response to an operation of the operator by the user.

3. The audio mixing console as claimed in claim 1, wherein the lighting control data stored in the memory are composed of data indicating brightness to cause the corresponding LED to be turned on by means of a voltage value, wherein the lighting control section controls lighting-up of each of the plurality of LEDs constituting the multicolor LED unit on the basis of the voltage value indicated by the lighting control data stored in the memory, and wherein the brightness adjusting section changes the voltage value indicated by the lighting control data stored in the memory in response to an operation of the operator by the user.

4. The audio mixing console as claimed in claim 1, wherein the operator operated by the user in the brightness adjusting mode is one LED operator, and wherein the brightness adjusting section changes brightness, indicated by the lighting control data stored in the memory, of the LED corresponding to the color specified by the adjustment subject specifying section in the multicolor LED unit incorporated in the LED operator in response to an operation of the LED operator by the user.

5. The audio mixing console as claimed in claim 1, wherein the brightness adjusting section changes the brightness, indicated by the lighting control data stored in the memory, of the plurality of LEDs corresponding to the color specified by the adjustment subject specifying section in the plurality of multicolor LED units incorporated in each of the predetermined plurality of LED operators other than the operated operator when the user operates any one of the plurality of operators in the brightness adjusting mode.

6. The audio mixing console as claimed in claim 1, wherein the operator operated by the user in the brightness adjusting mode is a push-button switch, and the brightness adjusting section changes the brightness, indicated by the lighting control data stored in the memory, of the LED corresponding to the color specified by the adjustment subject specifying section in the multicolor LED unit incorporated in the LED operator corresponding to the push-button switch by increasing the brightness of the LED indicated by the lighting control data one step by one step every one operation of the push-button switch.

7. The audio mixing console as claimed in claim 1, wherein the adjustment subject specifying section is constructed from a first specifying section for specifying the predetermined plurality of colors constituting the multicolor LED unit as adjustment subject one color by one color in response to an operation of the user and a second specifying section for specifying all colors of the predetermined plurality of colors as the adjustment subject in a lump, wherein, in the case where one color of the plurality of colors is specified as the adjustment subject by the adjustment subject specifying section, the brightness adjusting section changes brightness, indicated by the lighting control data stored in the memory, of the LED corresponding to the specified one color in response to an operation of the operator by the user, and wherein, in the case where all colors of the plurality of colors are specified as the adjustment subject in a lump in response to an operation of the operator by the user, the brightness adjusting section changes brightness, indicated by each of the lighting control data stored in the memory, of each of the LEDs corresponding to the specified all colors.

8. The audio mixing console as claimed in claim 1, wherein the adjustment subject specifying section is constructed from:

a predetermined plurality of brightness adjustment operators corresponding to the LEDs of the predetermined plurality of colors constituting the multicolor LED unit; and an assigning section for respectively assigning, in response to an operation of the LED operator by the user, the lighting control data corresponding to the plurality of LEDs constituting the multicolor LED unit incorporated in the LED operator to the predetermined plurality of brightness adjustment operators for the respective LEDs in the brightness adjusting mode, and wherein the brightness adjusting section changes the brightness indicated by the lighting control data assigned to the operated brightness adjustment operator by the assigning section when the brightness adjustment operator is operated by the user.

9. The audio mixing console as claimed in claim 8, wherein the brightness adjustment operator is a knob type operator operated by being rotated.

10. The audio mixing console as claimed in claim 8, wherein the assigning section includes a section for assigning the lighting control data for the plurality of LEDs of the multicolor LED unit corresponding to the operated LED operator to one of the brightness adjustment operators in a lump when any one of the plurality of LED operators is operated by means of an operation of the user, and wherein, in the case where the lighting control data for the plurality of LED are assigned to one brightness adjustment operator in a lump, the brightness adjusting section changes brightness, indicated by the lighting control data for the plurality of LEDs assigned to the operated brightness adjustment operator by the assigning section, in a lump when the brightness adjustment operator is operated by the user.

11. A method of operating the audio mixing console as claimed in claim 8, the method comprising:

assigning, in response to an operation of an LED operator of a user, lighting control data for a plurality of LEDs of a multicolor LED unit corresponding to the LED operator to the predetermined plurality of brightness adjustment operators in a brightness adjusting mode;

adjusting, in response to an operation of the brightness adjustment operator by the user, brightness of the LED operator in which the multicolor LED unit is incorporated by changing the brightness of the LED corresponding to the operated brightness adjustment operator; and repeating the above steps for another LED operator after brightness adjustment of the LED operator is terminated.

12. A method of operating the audio mixing console as claimed in claim 1, the method comprising:

specifying a color in response to an operation of a user in a brightness adjusting mode, the color becoming an adjustment subject;

changing brightness of an LED corresponding to the specified color in the multicolor LED unit incorporated in an LED operator corresponding to the operator in response to an operation of the operator by the user;

adjusting brightness of the LED operator in which the multicolor LED unit is incorporated by repeating specifying other color as the adjustment subject in response to an operation of the user after the brightness adjustment for the LED is terminated and changing the brightness of the other color thus specified; and carrying out the above steps for a plurality of LED operators.

13. An audio mixing console, comprising:

a plurality of operators including a plurality of LED operators, a multicolor LED unit being incorporated in each LED operator, the multicolor LED unit including a plurality of LEDs corresponding to a predetermined plurality of colors as one set;

a memory for storing lighting control data respectively corresponding to the plurality of LEDs constituting the multicolor LED unit, the lighting control data indicating brightness to cause the corresponding LEDs to be turned on;

a lighting control section for causing the multicolor LED unit to be turned on with hue according to a ratio of the brightnesses of the plurality of LEDs by controlling lighting of the plurality of LEDs constituting the multicolor LED unit on the basis of each of the lighting control data stored in the memory;

an operation mode switching section for switching, in response to an operation of a user, an operation mode of the audio mixing console to a hue adjustment mode for adjusting hue of the multicolor LED unit;

an adjustment subject specifying section for specifying, in response to an operation of the user, at least any one of the predetermined plurality of colors constituting the multicolor LED unit as a color of the adjustment subject; and a color adjusting section for changing, when the user operates any one of the plurality of operators in the hue adjustment mode, the ratio of the brightnesses of the plurality of LEDs so that the brightness of the LED corresponding to the color specified by the adjustment subject specifying section in the multicolor LED unit incorporated in the LED operator corresponding to the operated operator becomes relatively high.

14. The audio mixing console as claimed in claim 13, wherein the color adjusting section heightens the brightness, indicated by the lighting control data stored in the memory, of the LED corresponding to the color specified by the adjustment subject specifying section, and lowers the brightnesses, indicated by the lighting control data stored in the memory, of the LEDs corresponding to the colors other than the color specified by the adjustment subject specifying section.

15. The audio mixing console as claimed in claim 13, wherein the lighting control data stored in the memory are composed of data indicating brightness to cause the corresponding LED to be turned on by a time pattern, the time pattern defining length of time to cause an LED to be turned on within a predetermined period of time, wherein the lighting control section carries out control for causing each of the plurality of LEDs constituting the multicolor LED unit to turn on and off on the basis of the time pattern indicated by the lighting control data stored in the memory every lighting period longer than the predetermined period of time, and wherein the color adjusting section changes, in response to an operation of the operator by the user, the time pattern indicated by the lighting control data stored in the memory into one in which brightness of the LED corresponding to the color specified by the adjustment subject specifying section is higher.

16. The audio mixing console as claimed in claim 13, wherein the lighting control data stored in the memory are composed of data indicating brightness to cause the corresponding LED to be turned on by means of a voltage value, wherein the lighting control section controls lighting-up of each of the plurality of LEDs constituting the multicolor LED unit on the basis of the voltage value indicated by the lighting control data stored in the memory, and wherein the color adjusting section heightens the voltage value, indicated by the lighting control data stored in the memory, of the LED corresponding to the color specified by the adjustment subject specifying section in response to an operation of the operator by the user.

17. The audio mixing console as claimed in claim 13, wherein the operator operated by the user in the hue adjustment mode is an LED operator; and wherein the color adjusting section changes, in an operation of the LED operator by the user, the ratio of the brightnesses of the plurality of LEDs constituting the multicolor LED unit so that the brightness of the LED corresponding to the color specified by the adjustment subject specifying section in the multicolor LED unit incorporated in the LED operator becomes relatively high.

18. The audio mixing console as claimed in claim 13, wherein the color adjusting section changes, when the user operates any one of the plurality of operators in the hue adjustment mode, the ratio of the brightnesses of the plurality of LEDs constituting each of the plurality of multicolor LED units so that the brightnesses of the plurality of LEDs corresponding to the color specified by the adjustment subject specifying section in the plurality of multicolor LED units, incorporated in each of the predetermined plurality of LED operators other than the operated operator becomes relatively high.

19. The audio mixing console as claimed in claim 13, wherein the operator operated by the user in the hue adjustment mode is a push-button switch, and the color adjusting section changes the ratio of the brightnesses of the plurality of LEDs by increasing the brightness of the LED indicated by the lighting control data one step by one step every one operation of the push-button switch, so that the brightness of the LED corresponding to the color specified by the adjustment subject specifying section in the multicolor LED unit incorporated in the LED operator corresponding to the push-button switch becomes relatively high.

20. The audio mixing console as claimed in claim 13, wherein the adjustment subject specifying section specifies, in an operation of the user, the predetermined plurality of colors constituting the multicolor LED unit one color by one color as the adjustment subject, and wherein, in the case where one color of the plurality of colors is specified as the adjustment subject by the adjustment subject specifying section, the color adjusting section changes, in response to an operation of the operator by the user, the ratio of the brightnesses of the plurality of LEDs constituting the multicolor LED unit so that the brightness of the LED corresponding to the specified one color becomes relatively high.

21. A method of operating the audio mixing console as claimed in claim 20, the method comprising:

assigning, in response to an operation of an LED operator of a user, lighting control data for a plurality of LEDs of a multicolor LED unit corresponding to the LED operator to the predetermined plurality of hue adjustment operators in a hue adjustment mode;

adjusting, in response to an operation of the hue adjustment operator by the user, hue of the LED operator in which the multicolor LED unit is incorporated by changing the ratio of the brightnesses of the plurality of LEDs so that the brightness of the LED corresponding to the operated hue adjustment operators becomes relatively high; and repeating the assigning the lighting control data and the adjusting the hue for another LED operator after the hue adjustment of the LED operator is terminated.

22. The audio mixing console as claimed in claim 13, wherein the adjustment subject specifying section is constructed from:

a predetermined plurality of hue adjustment operators corresponding to the LEDs of the predetermined plurality of colors constituting the multicolor LED unit; and an assigning section for respectively assigning, in response to an operation of the LED operator by the user, the lighting control data corresponding to the plurality of LEDs constituting the multicolor LED unit incorporated in the LED operator to the predetermined plurality of hue adjustment operators for the respective LEDs in the brightness adjusting mode, and wherein the color adjusting section changes the ratio of the brightnesses of the plurality of LEDs by changing the brightness indicated by the lighting control data assigned to the operated hue adjustment operator by the assigning section when the hue adjustment operator is operated by the user.

23. The audio mixing console as claimed in claim 22, wherein the hue adjustment operator is a knob type operator operated by being rotated.

24. A method of operating the audio mixing console as claimed in claim 13, the method comprising:

specifying a color by means of an operation of a user in a hue adjustment mode, the color becoming an adjustment subject;

changing, in response to an operation of the operator by the user, a ratio of brightnesses of a plurality of LEDs corresponding to the multicolor LED unit so that brightness of an LED corresponding to the specified color in the multicolor LED unit incorporated in an LED operator corresponding to the operator becomes relatively high;

adjusting hue of the LED operator, in which the multicolor LED unit is incorporated, by repeating specifying other color as the adjustment subject in response to an operation of the user after the hue adjustment for the LED is terminated and changing the ratio of the brightnesses of the plurality of LEDs with respect to the specified color; and carrying out the above steps for a plurality of LED operators.

* * * * *